United States Patent
Ewing

(10) Patent No.: US 10,729,274 B2
(45) Date of Patent: Aug. 4, 2020

(54) COLD BREW COMPOSITIONS AND METHODS

(71) Applicant: Todd Ewing, Walnut Creek, CA (US)

(72) Inventor: Todd Ewing, Walnut Creek, CA (US)

( * ) Notice: Subject to any disclaimer, the term of this patent is extended or adjusted under 35 U.S.C. 154(b) by 124 days.

(21) Appl. No.: 16/004,448

(22) Filed: Jun. 11, 2018

(65) Prior Publication Data

US 2019/0374061 A1  Dec. 12, 2019

(51) Int. Cl.

| | |
|---|---|
| A47J 31/00 | (2006.01) |
| A23L 29/262 | (2016.01) |
| A47J 31/40 | (2006.01) |
| A47J 31/22 | (2006.01) |
| A23L 2/38 | (2006.01) |
| A23L 2/40 | (2006.01) |
| A23L 2/54 | (2006.01) |
| A23L 2/56 | (2006.01) |
| A23L 2/60 | (2006.01) |
| A23L 2/66 | (2006.01) |
| A23L 2/72 | (2006.01) |
| A23L 2/02 | (2006.01) |
| A23L 5/30 | (2016.01) |
| A23L 27/12 | (2016.01) |
| A23L 27/28 | (2016.01) |
| A23L 29/212 | (2016.01) |
| A23L 29/238 | (2016.01) |
| A23L 29/25 | (2016.01) |
| A47J 31/42 | (2006.01) |

(52) U.S. Cl.
CPC ............... *A47J 31/002* (2013.01); *A23L 2/02* (2013.01); *A23L 2/38* (2013.01); *A23L 2/40* (2013.01); *A23L 2/54* (2013.01); *A23L 2/56* (2013.01); *A23L 2/60* (2013.01); *A23L 2/66* (2013.01); *A23L 2/72* (2013.01); *A23L 5/30* (2016.08); *A23L 27/12* (2016.08); *A23L 27/28* (2016.08); *A23L 29/212* (2016.08); *A23L 29/238* (2016.08); *A23L 29/25* (2016.08); *A23L 29/262* (2016.08); *A47J 31/22* (2013.01); *A47J 31/40* (2013.01); *A47J 31/42* (2013.01)

(58) Field of Classification Search
USPC .............................. 426/330.3, 597, 393, 565
See application file for complete search history.

(56) References Cited

U.S. PATENT DOCUMENTS

| | | |
|---|---|---|
| 2,878,746 A | 3/1959 | Schwinger |
| 5,511,465 A | 4/1996 | Friedrich et al. |
| 5,554,400 A | 9/1996 | Stipp |
| 5,656,321 A | 8/1997 | Berger et al. |
| 5,753,295 A | 5/1998 | Goldman |
| 6,399,136 B1 | 6/2002 | Watkins, Jr. et al. |
| 7,186,433 B2 | 3/2007 | Serpelloni |
| 7,799,364 B2 | 9/2010 | Colliver et al. |
| 7,858,133 B2 | 12/2010 | Neace, Jr. et al. |
| 8,720,321 B2 | 5/2014 | Neace, Jr. et al. |
| 8,740,116 B2 | 6/2014 | Lefkovitz |
| 8,940,353 B2 | 1/2015 | Bringe et al. |
| 9,233,824 B2 | 1/2016 | Kirschner et al. |
| 9,386,782 B2 * | 7/2016 | Choi ..................... A23F 5/267 |
| 9,402,405 B2 | 8/2016 | Vastardis et al. |
| 9,585,924 B1 | 3/2017 | Bacigalupi |
| 9,718,035 B2 | 8/2017 | Bandixen et al. |
| 9,801,405 B2 | 10/2017 | Kleinrichert |
| 9,788,562 B2 | 11/2017 | Rivera et al. |
| 9,826,763 B2 | 11/2017 | Tan et al. |
| 9,844,296 B2 | 12/2017 | Stein et al. |
| 9,907,427 B2 | 3/2018 | St-Germain et al. |
| 9,907,430 B2 | 3/2018 | Vastardis et al. |
| 9,930,987 B2 | 4/2018 | Hulett et al. |
| 9,936,721 B2 | 4/2018 | Venables et al. |
| 9,961,917 B2 | 5/2018 | van Schyndel et al. |
| 2010/0034950 A1 * | 2/2010 | Jones .................... A23F 5/24 426/595 |
| 2011/0027427 A1 * | 2/2011 | Panyam ................ A23G 9/44 426/112 |
| 2011/0070337 A1 | 3/2011 | Chiaverini |
| 2011/0300264 A1 * | 12/2011 | Neta ..................... A23L 2/385 426/61 |
| 2016/0007626 A1 * | 1/2016 | Choi ..................... A47J 31/002 426/433 |

FOREIGN PATENT DOCUMENTS

| | | | | |
|---|---|---|---|---|
| EP | 3420825 A1 * | 1/2019 | ............. | A23F 3/163 |
| JP | 02053465 A * | 2/1990 | ............... | A23F 3/30 |
| WO | WO-2016178091 A1 * | 11/2016 | ............... | A23F 3/30 |

OTHER PUBLICATIONS

NPL—Machine Translation EP3420825.*
Bodnarluc, D., "Quick Cold Brew Coffee," Mar. 26, 2015, https://coffee-brewing-methods.com/cold-brew/quick-cold-brew-coffee/ (Obtained from the internet on May 22, 2018).
Henry, A., "Make Cold Brewed Coffee," Oct. 25, 2013, https://lifehacker.com/make-cold-brewed-coffee-in-your-blender-1451774408 (Obtained from the Internet on May 22, 2018).

* cited by examiner

*Primary Examiner* — Nina Bhat

(57) ABSTRACT

Cold-brewed compositions and methods for preparing them are disclosed that comprise the general steps of: (a) adding together ingredients comprising unheated aqueous liquid, a variety of brewing ingredients, and emulsion stabilizers comprising polysaccharides to obtain various aqueous mixtures; (b) grinding brewing ingredients amidst the obtained aqueous mixtures for a period of 30 seconds to three minutes to obtain various dispersions of finely ground brewing particles; and (c) removing brewing particles large enough to be detected by the tongue or mouth to obtain a variety of novel cold-brewed compositions that possess stabilized emulsions.

20 Claims, No Drawings

COLD BREW COMPOSITIONS AND METHODS

REFERENCES CITED

U.S. PATENT DOCUMENTS

| | | |
|---|---|---|
| 2,878,746 | March 1959 | Schwinger |
| 5,511,465 | April 1996 | Friedrich, et al. |
| 5,554,400 | September 1996 | Stipp |
| 5,656,321 | August 1997 | Berger, et al. |
| 5,753,295 | May 1998 | Goldman |
| 6,399,136 | June 2002 | Watkins, Jr., et al. |
| 7,186,433 | March 2007 | Serpelloni |
| 7,858,133 | December 2010 | Neace, Jr., et al. |
| 7,799,364 | September 2010 | Colliver, et al. |
| 8,720,321 | May 2014 | Neace, Jr., et al. |
| 8,740,116 | June 2014 | Lefkovitz |
| 8,940,353 | January 2015 | Bringe, et al |
| 9,233,824 | January 2016 | Kirschner, et al. |
| 9,585,924 | Mar. 7, 2017 | Bacigalupi |
| 9,402,405 | August 2016 | Vastardis, et al. |
| 9,718,035 | August 2017 | Bandixen, et al. |
| 9,788,562 | October 2017 | Rivera, et al. |
| 9,801,405 | October 2017 | Kleinrichert |
| 9,826,763 | November 2017 | Tan, et al. |
| 9,844,296 | December 2017 | Stein, et al. |
| 9,907,427 | March 2018 | St-Germain, et al. |
| 9,907,430 | March 2018 | Vastardis, et al. |
| 9,930,987 | April 2018 | Hulett, et al. |
| 9,936,721 | April 2018 | Venables, et al. |
| 9,961,917 | May 2018 | van Schyndel, et al. |

U.S. PATENT APPLICATIONS

| | | |
|---|---|---|
| 2011/0070337 | March 2011 | Chiaverini |
| 62/547,817 | August 2017 | Ewing |

OTHER REFERENCES

Bodnariuc, D., "Quick Cold Brew Coffee—How To Make A Cold Brew Coffee In 3 Minutes," Mar. 26, 2015, https://coffee-brewing-methods.com/cold-brew/quick-cold-brew-coffee/(Obtained from the internet on May 22, 2018) entire document Henry, A., "Make Cold Brewed Coffee in Your Blender," Oct. 25, 2013, https://lifehacker.com/make-cold-brewed-coffee-in-your-blender-1451774408 (Obtained from the Internet on May 22, 2018)

COPYRIGHT STATEMENT

The material in this patent document is subject to copyright protection under the copyright laws of the United States and other countries. The copyright owner does not object to the facsimile reproduction of the patent document or the patent disclosure, but, otherwise, all other rights are reserved.

BACKGROUND OF THE INVENTION

Field of the Invention

The present invention relates generally to beverage production systems and more specifically to processes for preparing cold brew beverages. The process begins with cold water to which is added a minimally processed whole-food brewing ingredient along with an emulsion stabilizer, and the process ends with a cold beverage that is infused with an emulsion of natural flavors and fragrant oils. When whole coffee beans are used as a brewing ingredient, the process makes a cold brew coffee infused with a milky emulsion of coffee oils. When whole tea leaves, herbs, and spices are used as a brewing ingredient, the process makes cold brew tea infused with a milky emulsion of spice oils. When fresh or dried fruits and vegetables are used as brewing ingredient, the process makes juice-infused water containing a milky emulsion of fragrant oils.

Description of the Prior Art

Consumers are constantly searching for beverages that provide greater flavor, health-promotion, and performance-enhancing benefits. While coffee and tea have been a flavorful source of caffeine and antioxidants for centuries, beverage producers have begun providing consumers with cold-brewed coffee and tea that is milder than hot-brewed coffee and tea, while still offering rich flavors and natural caffeine. Beverage producers have also begun providing fresher juices and infused waters that are higher in perceived health benefits and lower in sugar. Beverage producers have also been providing wider varieties of non-dairy milk beverages made from a variety of nuts that are associated with healthy fats and other nutrients.

Within the field of cold brew coffee production, there is constant innovation to develop coffee beverages that appeal to a wider audience of consumers and that may attract consumers who prefer milder beverages that traditional coffee. Coffee producers are also innovating cold brewing methods that normally take 12 to 24 hours and are now offering new processes that take from five minutes to 45 minutes. Coffee producers have also experimented with various sweetened, blended, and nitrogen-infused coffee concoctions to attract new and cross-over customers. Besides coffee, there is innovation to develop cold brew teas, juices, and infused waters with greater perceived health benefits, richer flavor, and fewer calories.

In the search for an innovative coffee beverage that appeals to new potential customers, the present invention provides a brewing method that brews a coffee beverage that is milder and creamier than current coffee offerings and that is faster than current methods. The present invention can be modified easily, for example, by adjusting the temperature and duration that the brewing ingredient is ground in the aqueous mixture, so the present process can accommodate many different kinds of edible brewing ingredients, including coffee, tea, spices, dried fruits, and fresh fruits and vegetables.

Many alternate but less optimal methods for cold brewing have been described. For example, U.S. Pat. No. 2,878,746 to Schwinger describes one of the earliest cold brewing apparatuses, a vertical cylinder with a fixture to drip ambient temperature water over coffee grounds, with water-permeable shelves to hold the coffee grounds, a water-tight bottom to collect the extraction water, and a recirculation system that collects extraction water from the bottom of the cylinder, pumps it to the top, through the fixture, and drips it back over the coffee grounds. This patent highlights the many exceptional properties of cold brewed coffee, such as its reduced acidity, rancidity and caffeine and its greater storage stability, flavor stability, and compatibility with serving either hot or cold.

U.S. Pat. No. 6,399,136 to Watkins, Jr., et al. discloses a process to create a coffee syrup involving a 12- to 24-hour extraction step in ambient temperature water in a vessel with optional continuous mixing. It is followed by filtration, high temperature processing, cooling, packaging, and storage.

This patent highlights the exceptional flavor and storage stability of the coffee concentrate created by cold extraction.

U.S. Pat. No. 9,961,917 to van Schyndel, et al. discloses a cold coffee extraction process involving an infusion chamber and a brewing chamber and a pump that circulates infusion water between the two chambers. The pump was preferred to operate in pulses which may speed up the cold infusion process from the typical 12- to 24-hour timeframe, though no speed up is disclosed.

U.S. Pat. No. 9,402,405 to Vastardis, et al. discloses a brewing process that accelerates extraction by reducing and increasing the pressure of the system in cycles. The reduced pressure is known to remove air bubbles from the brewing ingredient which accelerates infusion. It discloses the use of a pod to contain the brewing ingredient which means that the brewing ingredient requires significant preprocessing, such as dry grinding, packaging into pods, and storage in pods for an indeterminate amount of time. U.S. Pat. No. 9,907,430 to Vastardis, et al. discloses an elaboration of the vacuum brewing device in which heating elements and a source of carbon dioxide gas are included in the apparatus.

The present invention pertains not only to cold brewing coffee, but to the production of a vast array of beverages. As a production method, it utilizes processing techniques similar to those used to produce non-dairy milk. Non-dairy milk production has been a source of innovation as it has expanded beyond soy milk and towards almond milk, coconut milk, and many other nut and grain milks. U.S. Pat. No. 5,656,321 to Berger, et al. discloses a process for producing almond milk stabilized by a hydrocolloid. U.S. Pat. No. 5,753,295 to Goldman discloses another method for producing almond milk stabilized by guar gum. U.S. Pat. No. 8,940,353 to Bringe, et al discloses another method for producing almond milk stabilized by the products of browning reactions that occur at high temperatures. In general, an almond flour and an emulsion stabilizer are dispersed in water, then heated, ground in the aqueous phase, filtered, sterilized, cooled, homogenized, and packaged.

BRIEF SUMMARY OF THE INVENTION

The present invention relates to addressing the tremendous consumer demand for cold brewed coffee, tea, and infused waters that provide refreshment and greater perceived health and functional benefits.

In a preferred embodiment of the present invention, a method to cold brew a coffee-infused beverage product has the following steps: the forming of an aqueous mixture of cold water, whole coffee beans, a sweetener, and a dietary fiber that acts as an emulsion stabilizer; the grinding together of the aqueous mixture and the concomitant infusion of flavor and color directly into the water phase; the removing of coffee grindings to yield a cold brew coffee beverage.

In another preferred embodiment of the present invention, a coffee-infused beverage product produced by the cold brewing method has many non-obvious features related to richness, creaminess, and mellowness. It was discovered that the coffee-infused beverage possesses unprecedented mellowness caused by the rapid release of mellow flavors during aqueous grinding. It was also discovered that the beverage possesses unprecedented milky creaminess. The beverage contains a suspension of microscopic droplets of coffee oils that are released from the whole coffee beans, homogenized by the grinding process, and stabilized by the polysaccharide and the sweetener. The coffee oils contribute negligible dietary fat and yet contribute significant milky and creamy flavor.

In another preferred embodiment of the present invention, a method to cold brew a juice-infused beverage product has the following steps: the dispersing of whole fruit and vegetable pieces, a sweetener, and a polysaccharide into cold water; the grinding together of all these aforementioned ingredients and the subsequent release of flavor directly into cold water; the removal of fruit pulp; and the packaging of the obtained beverage product. The novel cold brew method produces a juice-infused beverage with many non-obvious features related to fresh flavor notes and richness.

In another preferred embodiment of the present invention, a method to produce made-to-order cold-brewed beverage products has the following steps: the gathering of customer preferences for the beverage; the selection of brewing ingredients from a wide variety of coffee beans, tea leaves, herbs, spices, cacao nibs, fruits, and vegetables; the dispersing of the brewing ingredients into cold water; the aqueous grinding of the brewing ingredients and the subsequent release of flavor directly into cold water; the removal of brewing ingredient grindings; and the packaging of the obtained products into beverage containers. The method to produce made-to-order cold-brewed beverages has many advantages in terms of speed, efficiency, and flexibility. The method also can be accelerated by a computer and by automation at every step.

Those skilled in the art will recognize how the current invention utilizes processing techniques from the production of non-dairy milk, infused water, and cold brewing coffee in ways that are novel and non-obvious.

First, the current invention is novel and non-obvious because it utilizes brewing materials and emulsion stabilizers to create a creamy emulsion in addition to a flavorful infusion. On the other hand, both cold brew coffee production methods and infused water production methods use brewing ingredients alone to create a flavorful infusion with minimal emulsion or cloudiness. In contrast, non-dairy milk production uses emulsion-promoting materials over infusion-promoting materials and combines them with emulsion stabilizers to create a creamy emulsion with minimal flavor and color infusion. This difference arises in part because non-dairy milk beverages are attempting to reproduce the creamy white appearance and non-descript flavor of dairy milk.

Second, the current invention is novel and non-obvious because it initially mixes within water minimally-processed brewing ingredients such as whole coffee beans, whole tea leaves, whole herbs, whole spices, and whole pieces of fruits and vegetables. On the other hand, cold brew coffee production methods initially disperse within water ground coffee that has been dry milled to a specific particle size in a coffee grinder. Likewise, non-dairy milk production methods initially disperse within water refined emulsion materials such as powders and pastes derived from grains, legumes, nuts, and seeds. On this aspect, infused water production methods are most similar because they also use minimally-processed brewing ingredients.

Third, the current invention is novel and non-obvious because it combines grinding of an unheated aqueous mixture and, in some embodiments, grinding of an ice-cold aqueous mixture. On the other hand, cold brew coffee production methods utilize dry grinding followed by unheated brewing. On this aspect, non-dairy milk production methods are most similar, though they often utilize heated aqueous-phase grinding to facilitate emulsion followed by heated pasteurization. By contrast, infused-water production methods typically avoid grinding to preserve the clarity of the beverage.

The current invention is useful because there is a growing consumer market for naturally-brewed beverages and infused waters. The current invention provides a method to naturally brew caffeinated and non-caffeinated beverages that satisfy consumer preferences for cold refreshment while providing greater perceived health, functional, and performance benefits.

DETAILED DESCRIPTION OF THE INVENTION

Cold Brew Coffee

A preferred embodiment of the present invention is a method to cold brew coffee. The first step in the method is the forming of an aqueous mixture by adding together ice water, whole roasted coffee beans, a sweetener, and inulin.

The quantity of coffee beans is calculated from the water to coffee ratio recommended by the coffee bean provider for normal heated brewing. Coffee bean providers traditionally recommend a water to coffee ratio of about 17 to one for hot brew coffee, about eight to one for cold brew coffee, and about two to one for espresso. For the present invention, a water to coffee ratio of 17 to one produces a beverage that is so strong and invigorating, it would only be palatable to consumers who typically like the flavor of strong coffee. Surprisingly, the water to coffee ratio can be doubled to a ratio of about 35 to one and, at the same time, the brewing temperature can be reduced to the temperature of ice water, at which point the present invention produces a beverage that is flavorful yet palatable to consumers who typically do not like the flavor of strong coffee.

The advantage of the high water to coffee ratio utilized by the present invention can be better appreciated by considering the quantity of coffee beans and costs of goods needed to brew each kind of coffee. For one liter of coffee, hot coffee brewing would need 60 grams of coffee beans, cold brewing would need 120 grams of coffee beans, espresso would need 500 grams of coffee beans, and the present invention would need only 30 grams of coffee beans. Put another way, a single U.S. pound of coffee beans, or half a kilogram, would brew about eight liters of traditional hot coffee, about four liters traditional cold brew, about one liter of espresso, and 16 liters of cold brew coffee in accordance with the present invention.

A sweetener and inulin are also dispersed into ice water as emulsion stabilizers alongside the whole coffee beans. The main purpose of the sweetener is to sweeten the beverage. The amount of sweetener depends on the type of sweetener and degree of sweetness. Preferably, sugar and other high-calorie sweeteners would be used in a ratio of about 5% up to about 15% by weight of the aqueous mixture depending on the sweetness preferences of the customer. For one liter of aqueous mixture, too grams of sugar or another high-calorie sweetener would suffice. Preferably, *stevia* and other high-potency sweeteners would be used in a ratio of about 0.1% up to about 0.5% by weight of the aqueous mixture. For one liter of aqueous mixture, about one gram of *stevia* or another high-potency sweetener would suffice.

The main purpose of inulin is to stabilize the emulsion or suspension of flavorful coffee oils in the beverage during the step of aqueous grinding. The emulsion of coffee oil creates a milky appearance and creamy flavor to the cold brew coffee. Aside from its utility in this invention, inulin has perceived health benefits associated with a high-fiber diet, with healthier digestion, and with beneficial gut bacteria. Preferably, inulin would be used in a ratio of about 0.1% up to about 0.5% by weight of the aqueous mixture. For one liter of aqueous mixture, about one to five grams of inulin would suffice. Inulin is a soluble dietary fiber, a polysaccharide, a fructan, an oligosaccharide, and a fructooligosaccharide. Other polysaccharides and oligosaccharides besides inulin are known to stabilize emulsions too, so there are many alternatives to inulin that would serve as additional non-limiting examples for embodiments of this invention.

Inulin is naturally present in many plants, fruits, and vegetables. It was discovered as an important ingredient for the preferred embodiment of this current invention because inulin is contained in various levels in *stevia* sweeteners. Some brands of *stevia* sweeteners are less refined and contain significant amounts of plant material which includes inulin and related polysaccharides. These brands of *stevia* sweeteners were discovered to provide sufficient quantities of inulin-type polysaccharides that they would stabilize the suspension of coffee oils. Other brands of *stevia* sweeteners that are highly purified do not contain sufficient inulin-type polysaccharides to single-handedly stabilize the suspension of coffee oils, yet these brands of *stevia* still contribute positively with inulin that is added separately to help stabilize the suspension of coffee oils.

Without the addition of inulin, or *stevia* brands that contain sufficient quantities of it, the obtained coffee beverage tastes weak and thin. Most importantly, when inulin and *stevia* are added after the entire brewing process, the obtained coffee beverage also tastes weak and thin. This result proves that inulin-type polysaccharides are not by themselves creating a strong and thick flavor. Instead, the inulin-type polysaccharides actively support the brewing process by increasing the infusion of coffee flavors and oils into the beverage.

The grinding of the aqueous mixture of ice water, coffee beans, sweetener, and inulin drives the infusion and emulsion of coffee constituents. The temperature remains cool throughout the aqueous mixture because of the concomitant grinding of the ice pieces present in the mixture. By way of a non-limiting example, this step can be performed in a mechanical food preparation machine equipped with a rotating blade, such as a high-powered commercial-style blender or a reduced-pressure vacuum-sealed juicing blender. This step lasts about one minute to three minutes until the coffee beans in the aqueous mixture are finely ground and until further infusion no longer appreciably darkens the color of the aqueous mixture.

Many mechanical devices and configurations were evaluated for this step and surprisingly few devices could successfully grind coffee beans that are in an aqueous mixture to a sufficiently fine grind to accomplish sufficient flavor extraction from the ground beans. The most reliable device was a professional-grade Vitamix brand food preparation blender. Though a few other devices were found to also work, most blending devices either has an insufficiently powerful motor, inadequately crafted blades, or inadequately shaped food-containment vessel.

In addition to high-powered blenders, other suitable devices are colloid mills, high-shear mixers, and high-shear homogenizers. These devices employ the rotor-stator principle: a rotating blade is held in close proximity to a fixed stator which creates a high level of hydraulic shear where the surfaces of the rotor and stator are nearest. The rotor draws the particles in the aqueous mixture into the location of high-shear and pulverizes them into smaller particles.

The processing time required for grinding can be as short as one minute depending on, by way of a non-limiting example, the strength of the hydraulic shear created within the grinding device. To most people skilled in the art of coffee brewing, hot water or low pressure are presumed to be necessary for the rapid infusion of coffee constituents into water, which means infusion into ice water at ambient pressure would be presumed to be impractically slow. The rapid infusion induced by grinding the ice-cold aqueous mixture is non-obvious to a person skilled in the art and represents a breakthrough in the cold-brewing of coffee.

By grinding the coffee beans in ice water, the labile constituents of coffee are sheltered from the frictional and mechanical heat and atmospheric oxygen that is present during the traditional dry grinding of coffee beans in a coffee grinder. In addition, the labile constituents are released directly into the coffee beverage and undergo less oxidation, acidification, and spoiling. By way of a non-limiting example, when the grinding of the aqueous mixture is performed without ice, or even with warm water, the obtained coffee beverage appears darker and tastes more bitter like regular hot-water brewed coffee.

The acidity of a coffee beverage can be assessed by measuring its pH value, in which a neutral solution has a pH value of 7 and increasingly acidic solutions have pH values closer to 1. By way of a non-limiting example, a coffee brewed by the preferred embodiment of the invention had a measured pH value of 5.8, a traditional 12-hour cold-brewed coffee had a measured pH value of 5.7, and a traditional hot-brewed coffee had a measured pH value of 5.4 which is the most acidic by pH value, when all coffees were brewed with the same lot of coffee beans and with the same water to coffee brewing ratio.

The clarification of the aqueous mixture is accomplished by the removal of coffee grindings from the infused water. In the present embodiment of the invention, coffee grindings are removed by filter made from paper, nylon, or fabric materials with a mesh spacing between 200 microns and 75 microns. In other embodiments of the invention, the removal of fine coffee grinds is performed by existing methods of filtering and centrifuging. An alternate embodiment would filter the aqueous mixture using a nut milk bag that is squeezed by hand to provide the necessary positive pressure to force the aqueous mixture through the filter. Another preferred embodiment would use a commercial juice press such as the CT7 countertop press offered by Goodnature of Orchard Park, NY.

The obtained cold brew coffee beverage is served to a consumer. Alternatively, the obtained cold brew coffee beverage is sterilized and packaged for distribution as a ready-to-drink coffee beverage.

The processing time required to clarify the aqueous mixture by cold pressing can be less than a minute. The fact that the cold aqueous grinding and cold pressing steps only take about a minute each enables the entire cold brewing method to be completed in about two to three minutes of total elapsed time. The speed of this cold brewing method from start to finish allows coffee to be cold-brewed and served as fast or faster than it takes for traditional coffee to be ground from whole beans, hot brewed, filtered, and served which would be non-obvious to a person skilled in the art of coffee brewing.

The speed of this cold brewing method even rivals the speed of the espresso brewing method which utilizes elevated temperature and elevated pressure and requires about five minutes for whole coffee beans to be ground, packed into a puck, and extracted into an espresso cup. The present invention opens up opportunities in the beverage market for the cold brewing of coffee alongside the espresso brewing of coffee. Retail coffee shop can make individual servings of cold brew coffee in a way that is not only time efficient, it's also raw material efficient because it uses such a high water to coffee brewing ratio. Retail coffee shops can offer a wider variety of whole coffee beans for either espresso brewing or cold brewing.

The infusion at temperatures cooler than tap water has an unexpected influence on the flavor and creaminess of the infused beverage. The mellowest and freshest flavors contained in spices, fruits and vegetables, tea, herbs, coffee, and cacao infuse into the unheated water, while all the sharp and bitter flavors tend to remain in the fine grindings.

The grinding procedure provides another non-obvious discovery of the preferred embodiment. The grinding procedure creates a novel oil-in-water emulsion with the delicate oils extracted from the coffee bean. The novel emulsion imbues the coffee beverage with a milky appearance and creamy flavor. The novel emulsion contains a negligible amount of dietary fat and yet provides the creamy mouthfeel that is equivalent to coffee milk and caffè latte. The coffee beverage tastes rich and creamy despite being low in fat which presents a unique marketing opportunity to customers who prefer rich and creamy coffee but also want to reduce their calorie and fat intake.

This cold brewing method preserves the delicate flavors and aromatic oils in coffee and creates a cold coffee beverage with a flavor and creaminess that is unexpected and distinct from the cold-brewed coffee produced by other methods. It will likely appeal to a broad range of customers and bring new customers into the coffee beverage market. It has the potential to expand the strength and growth of the market. This cold brewing method enables the creation of a new category of coffee beverage that will co-exist alongside the many other coffee beverage products already enjoyed by consumers.

Effervescent Cold Brewed Coffee

After pressing, the obtained cold brew coffee beverage could undergo an optional step of infusing gaseous material. Nitrogen is a gaseous material with a chemical formula of $N_2$ that is often infused into cold brew coffee. Infused nitrogen gas creates tiny bubbles and a creamy head on the cold brew coffee when it is first served. Nitrous oxide is another gaseous material with a chemical formula of $N_2O$ that infuses into fat-containing liquids and is commonly used in whipped cream. Nitrous oxide creates tiny bubbles and a creamy head. Some cold brew producers are experimenting with adding dairy cream and gaseous nitrous oxide to their cold brew beverages. Carbon dioxide is another gaseous material with a chemical formula of $CO_2$ that is occasionally infused into cold brew coffees and teas but is more often infused into juices. Because carbon dioxide tends to make beverages more acidic, it can detract from the taste of coffee and tea while it can enhance the taste of juices. Carbon dioxide creates larger bubbles and contributes to a sharper, effervescent mouth-feel associated with colas, sodas, and sparkling juices.

Cold Brewed Beverages from any Brewing Ingredient

It was discovered that the present invention can brew a wide variety of cold brew beverages in addition to coffee. It can brew a beverage from any brewing ingredient that can be pulverized by a colloid mill, high-shear mixer, high-shear homogenizer, or high-powered blender. The invention works well with brewing ingredients that release water-soluble flavors to produce infused waters. Teas, herbs, and fruits and vegetables are suitable ingredients in this regard.

The present invention works especially well with brewing ingredients that also release volatile oils that can be emulsified by the emulsion stabilizer system employed by this invention. The volatile oils create a milky appearance and creamy flavor in the brewed beverage that is singularly unique to this invention. Herbs, spices, and the rinds of citrus fruits are suitable ingredients in this regard.

The present invention can brew a wide variety of beverages using a method that requires five minutes or less to complete. The invention provides the foundation for an enabling technology to offer a service to walk-up customers of made-to-order cold brewed beverages. The first step in such a beverage service is the gathering of beverage preferences from a customer. In the preferred embodiment, customers would select a beverage from one of three menus for either coffees, teas, or juice-infused beverages. This step could be automated by a computer that provides an interface to the customer to gather these preferences.

From the coffee menu, customers would select from a menu of whole roasted coffee beans including light roast, medium roast, medium dark roast, dark roast, city roast, American roast, breakfast roast, espresso roast, Italian roast, French roast, fresh roast, single origin, Colombian, Hawaiian, Kenyan, Sumatran, Central American, Ethiopian, peaberry, decaffeinated, flavored, and blended. Though customers may be familiar with choosing whole coffee bean options for artisanal espresso coffee, they would find such options for made-to-order cold brew coffee novel and without precedent. Customers would also select from a menu of coffee concoctions whose recipes of ingredients have already been selected and proportioned. Such coffee concoctions would combine whole coffee beans with complementary whole herbs and spices, dried fruits and vegetables, and cacao nibs.

From the tea menu, customers would select from a menu of whole tea leaves including green, white, black, oolong, Pu-erh, yerba mate. Customers would also select from a menu of tea concoctions whose recipes of ingredients have already been selected and proportioned. Such tea concoctions would combine whole tea leaves with complementary whole herbs and spices, dried fruits and vegetables, cacao nibs, and fresh fruit and vegetable pieces.

From the juice-infused beverage menu, customers would select from a menu of fresh fruits and vegetables. Customers would also select from a menu of juice-infused concoctions whose recipes of ingredients have already been selected and proportioned. Such juice-infused concoctions would combine fresh fruit and vegetable pieces with complementary whole herbs and spices, dried fruits and vegetables, and cacao nibs.

Next, customers would select from a menu of unheated liquids whose options would include filtered water, milk, and non-dairy milk. Customers would select how strong or how mild of a beverage they prefer. Milder beverages would be accommodated by providing a larger fraction of the unheated liquid as frozen pieces. Customers would also select from a menu of sweeteners whose options would include cane sugar, *stevia*, honey, agave. Finally, customers would select from a menu of optional nutritional supplements including vitamins, minerals, protein, and soluble fiber.

The raw materials are determined for the beverages based on the gathered customer preferences. This step could be automated by a computer employing an expert system. The menu item selected by the customer would have an associated recipe which would be used to determine the identity and quantity of each raw material.

The raw materials for several categories of ingredients were presented above. The raw materials needed within the additional category of whole herbs and spices could include roasted chicory, rooibos, chamomile, ginger, mint, *ginseng*, hibiscus, cinnamon, nutmeg, cloves, and turmeric. The raw materials needed within the category of dried fruits and vegetables could include orange, apple, berry, coconut, and cacao nibs. The raw materials needed within the category of raw fruit and vegetable pieces could include lemon, lime, orange, mango, strawberry, blueberry, carrot, celery, kale, and tomato.

The brewing temperature is another variable determined from customer preferences. Customer preference for a mellower brew corresponds to a cooler brewing temperature, which, in turn, corresponds to a larger fraction of the unheated liquid that is provided as frozen pieces. For mellower brews and cooler brewing temperatures, about 10% up to about 25% of the unheated aqueous liquid would be provided as frozen pieces. For more astringent brews at warmer brewing temperatures, about 10% or less of the unheated aqueous liquid would be provided as frozen pieces.

The raw materials needed for the beverage are obtained. This step could be automated by a computer employing an inventory management and automated dispensing system.

The raw materials are dispersed in the unheated aqueous liquid. This step could be automated by a computer employing a conveyance system and a hopper system.

The aqueous mixture is ground until the particles in it are finely ground. This step typically lasts one minute. It is complete when further grinding no longer appreciably reduces the size of brewing ingredient grindings and until further infusion no longer appreciably darkens the liquid water. By way of a non-limiting example, step can be performed with a colloidal mill, a high-shear mixer, a high-shear homogenizer, or a high-power blender. This step could be automated by a computer managing the power and timing of the grinding machinery.

The aqueous mixture is clarified by removing the brewing ingredient grindings that are perceptible by eye and by the mouth. This step is performed by filtering, pressing, or centrifuging. The preferred embodiment would use a nut milk bag with a 75 micron mesh size that is hand-squeezed. Another preferred embodiment would use a commercial juice press such as the CT7 countertop press offered by Goodnature of Orchard Park, NY.

The obtained beverage is served to the customer. Alternatively, the obtained beverage is sterilized and packaged into a suitable beverage container. The packaged beverage could be made available for pick-up by the customer, it could be delivered by a local delivery agent to the customer, and it could be shipped over a distance to the customer.

Effervescent Cold Brewed Beverages

Depending on customer preference, the clarified beverage can be infused with a gaseous material.

Nitrogen gas is commonly infused into cold brew coffee and occasionally cold brew tea because it forms smaller bubbles and a foamy head. Nitrogen gas would work equally well with the cold brewed coffee and tea beverages that are preferred embodiments of this invention. Nitrogen is infused by forcing the beverage through a restrictor which creates a thick and frothy head to form in the dispensed beverage.

Nitrous oxide is commonly infused into beverages with a fat content over 20%. Nitrous oxide would only work well with coffee and tea beverages that are mixed with large amounts of dairy cream or non-dairy cream.

Carbon dioxide is commonly infused into juices because it increases the acidity of the beverage and makes them sparkling juices. Carbon dioxide would work equally well with fresh fruit and fresh vegetable infusions that are preferred embodiments of this invention. Such fruit and vegetable infused beverages are significantly enhanced when they are carbonated and become sparkling juice infusions.

Concentrated Cold Brew Syrups and Applications

It was discovered that the emulsion stabilizer system utilized by this invention can stabilize the extraction and emulsion of flavors at up to a six-fold higher concentration from coffee and other brewing ingredients to form a concentrated cold brew syrup. In turn, these concentrated cold brew syrups can be subsequently diluted with water to reconstitute a cold brew beverage that is remarkably similar in flavor and appearance to the same beverage brewed at a normal brewing ratio with water.

Diluting a concentrated cold brew syrup with hot water creates a hot cold-brew coffee with a mellower flavor compared to regular black coffee. The hot cold-brew coffee has negligible calories and negligible fat just like black coffee, and yet it retains its infusion of mellow flavors and its creamy emulsion of volatile coffee oils. Its mellowness and creaminess would make it an ideal hot coffee beverage for consumers who do not prefer the flavor of hot black coffee. A hot cold brew would also have a strong appeal during cold weather and would allow this beverage to be marketed and consumed all year round. This application will work for cold brew concentrates obtained from every kind of brewing ingredient.

Diluting a concentrate with a carbonated water creates an instant cold brew soda. This application works best with cold brews made from brewing spices, fruits, and vegetables because these flavors taste better with the acidification caused by carbonation. Most soda machines in restaurants utilize a beverage syrup that is six-fold concentrated and when dispensed becomes six-fold diluted with carbonated water. Many brewing ingredients can accommodate a six-fold concentration and would be ideal for use in restaurant-style walk-up soda dispensers. For restaurant use, a concentrated cold brew syrup could be provided in a container that is compatible with soda dispensers. For home use, the concentrated cold brew syrup can simply be mixed by hand with a serving of seltzer water.

Pouring a cold brew concentrate over shaved ice or pellet ice creates a snow cone style of confection. This application works for cold brew concentrate obtained from every kind of brewing ingredient. In particular, the brews with high levels of emulsified volatile oils, such as coffee, spice, and citrus, will elicit a flavor like an ice cream.

Diluting a concentrate with dairy or non-dairy milk creates a rich and creamy beverage. This application works with every kind of brewing ingredient. Diluting a concentrate with dairy or non-dairy ice cream creates a milkshake dessert and also works with every brewing ingredient. Diluting a concentrate with dairy or non-dairy yogurt creates a rich and creamy beverage that would appeal to many consumers who enjoy high-protein foods and beverages.

Mass Production of Cold Brew Beverages

Another preferred embodiment of the present invention is a process to mass-produce cold-brewed beverages. For mass-production-scale cold-brewing, brewing ingredients and other ingredients are chosen for each batch to satisfy perceived customer preferences and the products obtained are packaged into suitable beverage packaging for refrigerated storage, transport, distribution, and sale at retail stores.

The invention claimed is:

1. A method to prepare a cold-brewed emulsion comprising the steps of:
   (a) adding together ingredients comprising unheated aqueous liquid, brewing ingredient, and emulsion stabilizer to obtain an aqueous mixture;
   (b) grinding and emulsifying said ingredients within said aqueous mixture for a duration of about 30 seconds up to about three minutes to obtain a stabilized emulsion of extracted flavors and oils within an aqueous dispersion of ground brewing particles; and
   (c) filtering away said ground brewing particles to obtain said cold-brewed emulsion.

2. The method of claim 1, wherein said unheated aqueous liquid comprises:
   unheated water at a temperature from of 15 degrees Celsius or less; or
   ice water with a sufficient amount of ice pieces to form up to 30% of the weight of said aqueous mixture in step (a) and to completely melt by the end of said grinding and emulsifying in step (b).

3. The method of claim 2, wherein:
   said emulsion stabilizer comprises one or more members selected from the group consisting of inulin, chicory root extract, acacia gum, ester gum, gellan gum, guar gum, locust bean gum, tara gum, xanthan gum, agar, alginin, arrowroot, carrageenan, dextrin, maltodextrin, methyl cellulose, pectin, polydextrose, *stevia, stevia* extract, tapioca, lecithin, oligosaccharide, and vegetable gum; and
   the amount of said emulsion stabilizer is the amount to form 0.01% to 1% of the weight of said aqueous mixture.

4. The method of claim 3, wherein:
   said brewing ingredient comprises whole or ground coffee beans; and
   the amount of said brewing ingredient the amount to form 0.1% to 10% of the weight of said aqueous mixture.

5. The method of claim 3, wherein:
   said brewing ingredient comprises one or more members selected from the group consisting of tea leaves, herb, spice, dried fruit, dried vegetable, and cacao; and
   the amount of said brewing ingredient is the amount to form 0.03% to 3% of the weight of said aqueous mixture.

6. The method of claim 3, wherein:
   said brewing ingredient comprises one or more members selected from the group consisting of fresh fruit and fresh vegetable; and
   the amount of said brewing ingredient is the amount to form 0.3% to 30% of the weight of said aqueous mixture.

7. The method of claim 3, wherein:
   said ingredients in step (a) further comprise one or more additives selected from the group consisting of low-potency sweetener, high-potency sweetener, flavoring, coloring, preservative, caffeine, guarana, vitamin, dietary mineral, amino acid, protein, taurine, omega-3 fatty acid, essential fatty acid, polyunsaturated fat, monounsaturated fat, and medium chain triglyceride;
   when said additive is a low-potency sweetener, the amount of said additive is the amount to form 0.15% to 15% of the weight of said aqueous mixture; and
   when said additive is not a low-potency sweetener, the amount of said additive is the amount to form 0.01% to 1% of the weight of said aqueous mixture.

8. The method of claim 7, further comprising:
   after step (c), dissolving at least one gaseous ingredient into said cold-brewed emulsion to obtain an effervescent cold-brewed emulsion.

9. The method of claim 7, further comprising:
   in step (a), doubling, tripling, quadrupling, quintupling, or sextupling the amounts of non-aqueous ingredients to obtain concentrated cold-brewed emulsion in step (c).

10. The method of claim 1, wherein:

said grinding and emulsifying step (b) is performed by at least one device selected from the group consisting of colloid mill, high-shear mixer, high-shear homogenizer, high-powered blender, and vacuum blender, wherein said device is operated at or below ambient temperature and at or below ambient atmospheric pressure.

11. The method of claim 1, wherein:

the filtering away step (c) is performed by at least one method selected from the group consisting of filtering, pressing, and centrifuging.

12. The method of claim 1, further comprising:

a computerized system to assist in the automation of any step in the preparing of said cold-brewed emulsion.

13. A cold-brewed emulsion prepared by the method of claim 1.

14. The cold-brewed emulsion of claim 13, wherein:

said emulsion stabilizer comprises one or more members selected from the group consisting of inulin, chicory root extract, acacia gum, ester gum, gellan gum, guar gum, locust bean gum, tara gum, xanthan gum, agar, alginin, arrowroot, carrageenan, dextrin, maltodextrin, methyl cellulose, pectin, polydextrose, *stevia, stevia* extract, tapioca, oligosaccharide, and vegetable gum; whereby the amount of said emulsion stabilizer is the amount to form 0.01% to 1% of the weight of the cold-brewed emulsion.

15. The cold-brewed emulsion of claim 14, wherein:

said unheated aqueous liquid comprises water or ice water;

said brewing ingredient comprises whole or ground coffee beans; and said cold-brewed emulsion has a milky appearance.

16. The cold-brewed emulsion of claim 14, wherein:

said unheated aqueous liquid comprises water or ice water;

said brewing ingredient comprises one or more members selected from the group consisting of tea leaves, herb, spice, dried fruit, dried vegetable, and cacao; and said cold-brewed emulsion has a cloudy appearance.

17. The cold-brewed emulsion of claim 14, wherein:

said unheated aqueous liquid comprises water or ice water;

said brewing ingredient comprises one or more members selected from the group consisting of fresh fruit and fresh vegetable; and said cold-brewed emulsion has a cloudy appearance.

18. The cold-brewed emulsion of claim 14, wherein:

said ingredients further comprise one or more additives selected from the group consisting of low-potency sweetener, high-potency sweetener, flavoring, coloring, preservative, caffeine, guarana, vitamin, dietary mineral, amino acid, protein, taurine, omega-3 fatty acid, essential fatty acid, polyunsaturated fat, monounsaturated fat, and medium chain triglyceride; whereby when said additive is a low-potency sweetener, the amount of said additive is the amount to form 0.15% to 15% of the weight of said aqueous mixture; and when said additive is not a low-potency sweetener, the amount of said additive is the amount to form 0.01% to 1% of the weight of said aqueous mixture.

19. The cold-brewed emulsion of claim 18, wherein:

said ingredients further comprise at least one dissolved gaseous ingredient; and said cold-brewed emulsion is effervescent.

20. The cold-brewed emulsion of claim 18, wherein:

said non-aqueous ingredients are doubled, tripled, quadrupled, quintupled, or sextupled; and said cold-brewed emulsion is a concentrate.

\* \* \* \* \*